(12) United States Patent
Hizmi (10) Patent No.: US 12,227,243 B2
(45) Date of Patent: Feb. 18, 2025

(54) MULTIFUNCTION GARDEN CART

(71) Applicant: Yoav Hizmi, Moshav Hagor (IL)

(72) Inventor: Yoav Hizmi, Moshav Hagor (IL)

( * ) Notice: Subject to any disclaimer, the term of this patent is extended or adjusted under 35 U.S.C. 154(b) by 360 days.

(21) Appl. No.: 17/562,773

(22) Filed: Dec. 27, 2021

(65) Prior Publication Data

US 2022/0119056 A1    Apr. 21, 2022

Related U.S. Application Data (63) Continuation-in-part of application No. PCT/IL2020/050780, filed on Jul. 12, 2020.

(60) Provisional application No. 62/873,987, filed on Jul. 15, 2019.

(51) Int. Cl.
*B62D 63/06*        (2006.01)
*B62B 1/12*         (2006.01)

(52) U.S. Cl.
CPC .............. *B62D 63/061* (2013.01); *B62B 1/12* (2013.01); *B62D 63/064* (2013.01); *B62B 2206/006* (2013.01)

(58) Field of Classification Search
CPC ..... B62B 1/12; B62B 2202/22; B62D 63/062; B62D 63/064
See application file for complete search history.

(56) References Cited

U.S. PATENT DOCUMENTS

| | | | | |
|---|---|---|---|---|
| 2,835,501 A | * | 5/1958 | Chamberlin | B62B 1/12 280/646 |
| 4,448,434 A | * | 5/1984 | Anderson | B62B 1/12 280/654 |
| 4,452,468 A | * | 6/1984 | Eads | B62B 1/12 280/654 |
| 4,629,203 A | * | 12/1986 | Ballard | B62B 1/12 294/51 |
| 4,917,393 A | * | 4/1990 | Rogers | B62B 1/12 248/129 |
| 5,380,033 A | * | 1/1995 | Harling | B62B 1/14 280/654 |

(Continued)

FOREIGN PATENT DOCUMENTS

| | | |
|---|---|---|
| DE | 202007012723 U1 | 11/2007 |
| GB | 2373761 A * | 10/2002 ............. A01K 5/008 |
| GB | 2427603 A | 1/2007 |

OTHER PUBLICATIONS

PCT International Search Report for International Application No. PCT/IL2020/050780, mailed Oct. 1, 2020, 6pp.

(Continued)

*Primary Examiner* — Katy M Ebner
(74) *Attorney, Agent, or Firm* — The Roy Gross Law Firm, LLC; Roy Gross (57) ABSTRACT

A multifunction garden cart, that can carry builders sack, where the cart is comprised of U-shaped chassis built of side rods connected by front rod. The U-shaped chassis is connected to two wheels attached at the center of the side rods. Various types of handles can be connected to the front rod, so it can be moves by a person or attached to a towing vehicle. Two rods pivotally attached to the side rods, can be secured vertically to the plane of the U-shaped chassis. A closed square top frame for use as builders sack support, is removably, pivotally attached at the top of the vertical rods.

10 Claims, 8 Drawing Sheets

(56) References Cited

U.S. PATENT DOCUMENTS

| | | | | |
|---|---|---|---|---|
| 6,082,574 | A * | 7/2000 | Johnson | B65F 1/06 |
| | | | | 220/23.91 |
| 6,193,256 | B1 * | 2/2001 | Banary, Jr. | B62D 59/00 |
| | | | | 280/DIG. 6 |
| 6,585,285 | B2 * | 7/2003 | Koch | B62D 63/061 |
| | | | | 280/789 |
| 7,543,842 | B1 * | 6/2009 | Fiorini | B62B 3/025 |
| | | | | 280/43 |
| 8,104,778 | B1 * | 1/2012 | Rojas | B62B 1/14 |
| | | | | 280/47.131 |
| 8,348,301 | B2 * | 1/2013 | Darling, III | A61G 1/0212 |
| | | | | 280/651 |
| 9,902,518 | B1 * | 2/2018 | Richardson | B65B 67/1205 |
| 10,017,198 | B1 * | 7/2018 | Stamper | B62B 1/20 |
| 10,703,398 | B1 * | 7/2020 | Huynh | B65B 67/1211 |
| 2002/0185831 | A1 * | 12/2002 | Chan | B62B 1/262 |
| | | | | 280/47.26 |
| 2005/0103950 | A1 * | 5/2005 | Joubert | B65F 1/1415 |
| | | | | 248/129 |
| 2008/0238012 | A1 * | 10/2008 | Carter | B62B 3/10 |
| | | | | 280/47.35 |
| 2008/0309038 | A1 * | 12/2008 | Gilligan | B65F 1/1468 |
| | | | | 280/47.24 |
| 2009/0032653 | A1 * | 2/2009 | Gilligan | B62B 1/14 |
| | | | | 248/101 |
| 2009/0152825 | A1 * | 6/2009 | Adams | B62B 1/266 |
| | | | | 383/33 |
| 2010/0002960 | A1 * | 1/2010 | Lasko | B62B 3/106 |
| | | | | 383/41 |
| 2020/0114798 | A1 * | 4/2020 | Medina | B62D 63/064 |
| 2021/0139064 | A1 * | 5/2021 | Felsenthal | B62B 3/106 |
| 2023/0278611 | A1 * | 9/2023 | Schepp | B62B 1/12 |
| | | | | 280/35 |

OTHER PUBLICATIONS

PCT Written Opinion for International Application No. PCT/IL2020/050780, mailed Oct. 1, 2020, 5pp.

PCT International Preliminary Report on Patentability for International Applicaiton No. PCT/IL2020/050780, completed Oct. 26, 2021, 6pp.

* cited by examiner

MULTIFUNCTION GARDEN CART

CROSS REFERENCE TO RELATED APPLICATION

This is a continuation in part of PCT Patent Application No. PCT/IL2020/050780, having International filing date of Jul. 12, 2020, which claims the benefit of U.S. Provisional Patent Application 62/873,987 filed on Jul. 15, 2019. The contents of the applications are all incorporated herein by reference in their entirety.

TECHNICAL FIELD

The present invention generally relates to the field of carts and more particularly, the present invention relates to multifunction garden cart.

BACKGROUND ART

Most wheelbarrows and garden carts are designed with a fixed shape or configuration. Their carrying volume of the scoop is limited.

U.S. Pat. No. 3,875,981 by Brenner et al discloses "Multi Positioning Garden Cart" that includes a small bag and a mechanism to help in collecting the debris from the ground and empty it into the bag. This cart cannot be used to carry small loads, such as lawn Mower.

U.S. Pat. No. 6,666,465 Chan discloses "Garden Trolley" that includes a removable collecting bag and array of removable attachment means for garden tools. However, the size of the bag is small, and is does not fit for large gardens.

Hence, there is a need for a multipurpose garden cart that can be pushed by hand or dragged by a motorized vehicle.

SUMMARY OF THE INVENTION

The invention discloses a multifunction garden cart, that can carry builders sack, hanged loads, or can be adapted with carrying surface for moving garden goods such as grass, and flowers. The cart is comprised of U-shaped chassis built of two chassis side rods connected by chassis front rod. The U-shaped chassis is connected to two wheels attached under the center of the chassis side rods. Various types of handles can be connected to the chassis front rod, so it can be moves by a person or attached to a towing vehicle. Two load carrying rods pivotally attached to the chassis side rods, can be secured vertically to the plane of the U-shaped chassis. A builders sack holding frame is removably, pivotally attached at the top of the load carrying rods.

The disclosed cart is unique because it is foldable and can be stored in a small space. It is adapted to conveniently carry builders sack so it can contain high volume of debris or other materials needed in the garden.

Note that the builders sack is always perpendicular to the ground, regardless of the tilt angle of the U-shaped chassis relative to the ground. In addition, the center of gravity of the load is very close to the wheels, so a person can rotate the cart using very small power (the moment arm of the user holding the man carrying handles is much bigger than the moment arm of the builders sack load)

The disclosed cart can be moved by hand or by a towing vehicle, such as grass mower.

DETAILED DESCRIPTION

The invention will be described more fully hereinafter, with reference to the accompanying drawings, in which certain possible embodiments of the invention are shown. The invention may, however, be embodied in many different forms and should not be construed as limited to the embodiments set forth herein; rather these embodiments are provided so that the disclosure will be thorough and complete, and will fully convey the scope of the invention to those skilled in the art.

In the following description, the same numerical references refer to similar elements. The embodiments, geometrical configurations, materials mentioned and/or dimensions shown in the figures or described in the present description are embodiments only, given solely for exemplification purposes.

Figure 1:
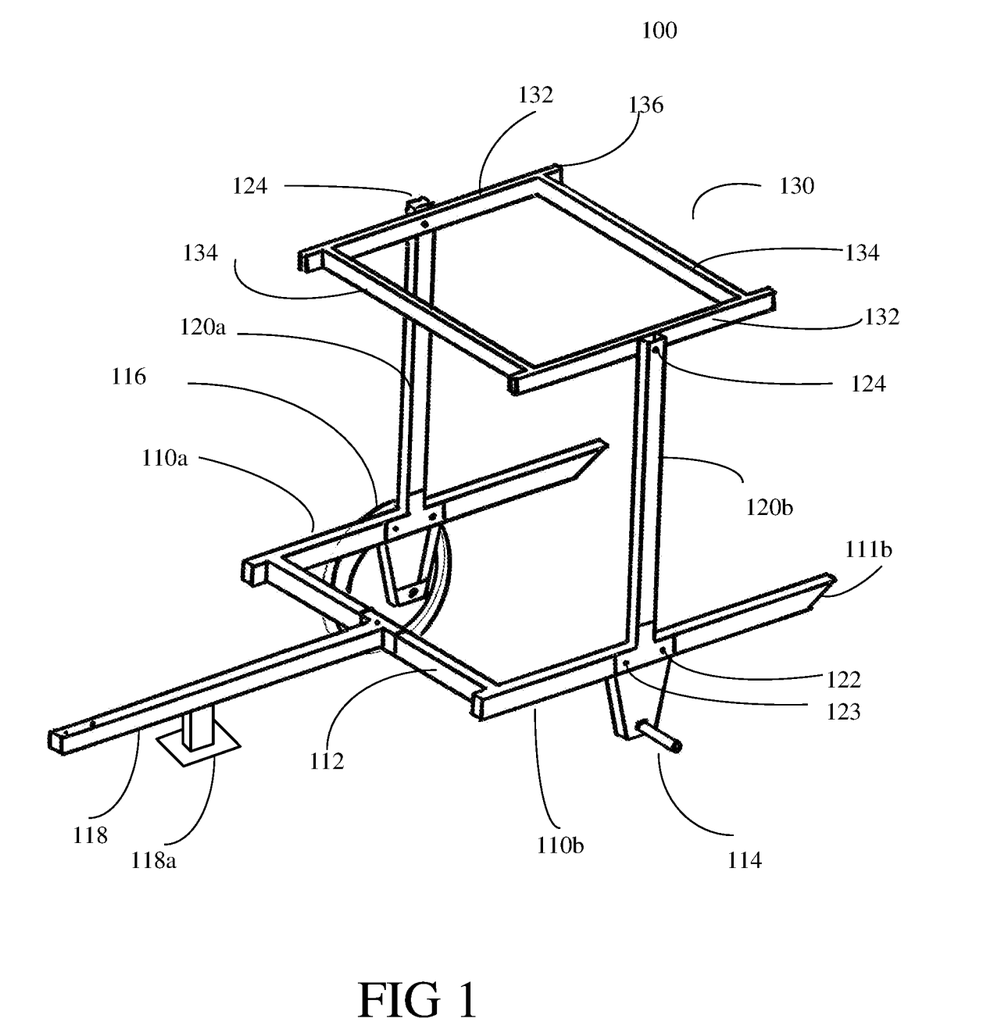
FIG. 1 shows basic structure of the disclosed garden cart.

The basic structure of the disclosed multi-function garden cart is presented in FIG. 1. The cart 100 is comprised of a U-shaped chassis, built from chassis side rods 110*a* and 110*b* connected by a chassis front rod 112. On the center of each chassis side rod a shaft 114 (shown only on chassis side rod 110*b*) is rigidly attached on which the cartwheels 116 are mounted. Different towing handles can be simply attached to the U-shaped chassis front rod 112. In FIG. 1 a towing handle 118 is attached to the chassis front rod 112. Support surface 118*a* is attached to the towing handle so the cart can rest on the two wheels and the support surface, when it is not connected to a towing vehicle, such as a motorised grass mower. Two load carrying rods, 120*a* and 120*b* are pivotally attached to the chassis side rods 110*a* and 110*b*, respectively. Each load carrying rod can be positioned vertically or horizontally relative to the U-shaped chassis by use of pins 122 and 123. Note that the wheel shafts are mounted under the position of the load carrying rods 120*a*, 120*b*. Detailed description of such positioning mechanism is presented in FIG. 2, as will be described in the following section.

Figure 2:
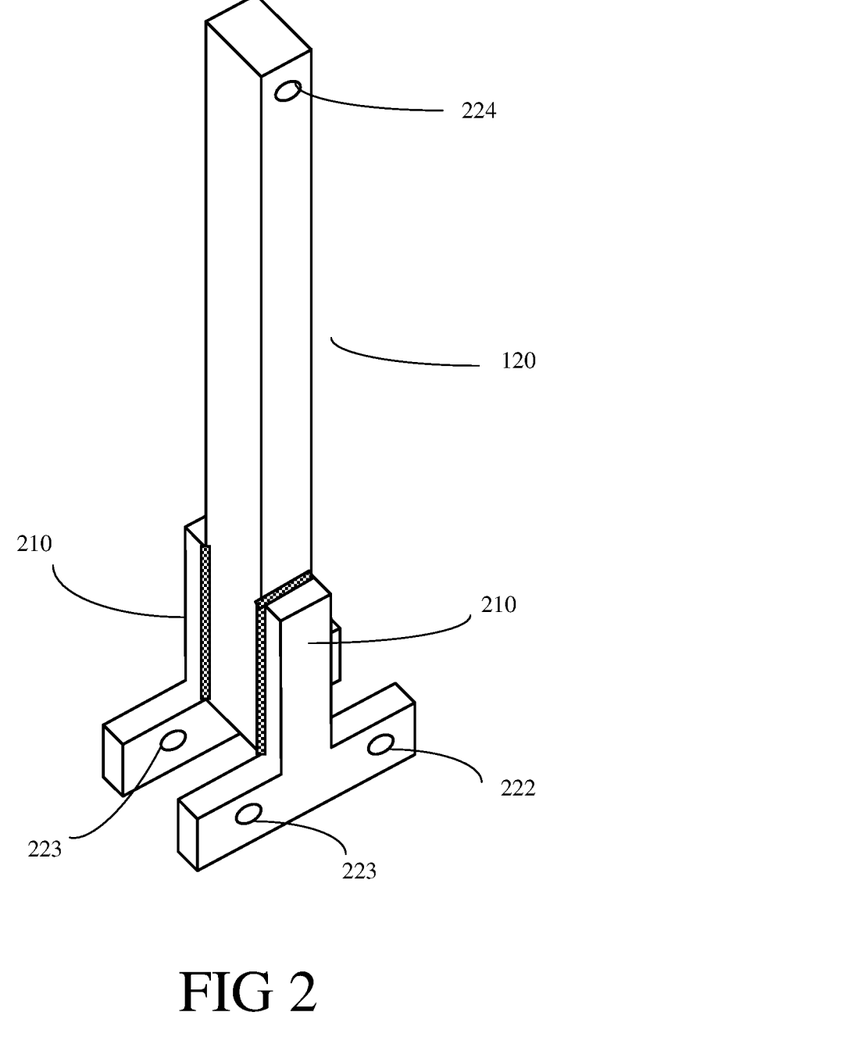
FIG. 2 shows detail of an embodiment of the vertical rods.

An embodiment of the positional mechanism for mounting the load carrying rods 120*a* and 120*b* is presented in FIG. 2. Each load carrying rod 120*a* or 120*b* is firmly attached to two T-shaped plates 210 (by welding), as shown in the FIG. 2. On the bottom part of the lower part of the T-shaped plates there are holes 222 and 223 through which quick release hinge spring balls can be inserted. Note that on the chassis side rods, 110*a* and 110*b*, there are matching holes to those on the T-shaped plate that allows a quick release hinge spring balls to be inserted through the holes in the T-shaped plates and through the holes in the chassis side rods. When in vertical position, two quick release hinge spring balls 122, 123 (FIG. 1) are inserted through the holes 222 and 223 in the load carrying rods and the hole in the chassis side rod so that the load carrying rod is secured in vertical position. When the load carrying rod is to be positioned in horizontal state, one hinge spring ball is taken out, so that the remaining hinge spring ball is the hinge around which the load carrying rod can be rotated. At the top of each load carrying rod there is a hole 224 through which pin hinge 124 can be inserted.

Figure 3:
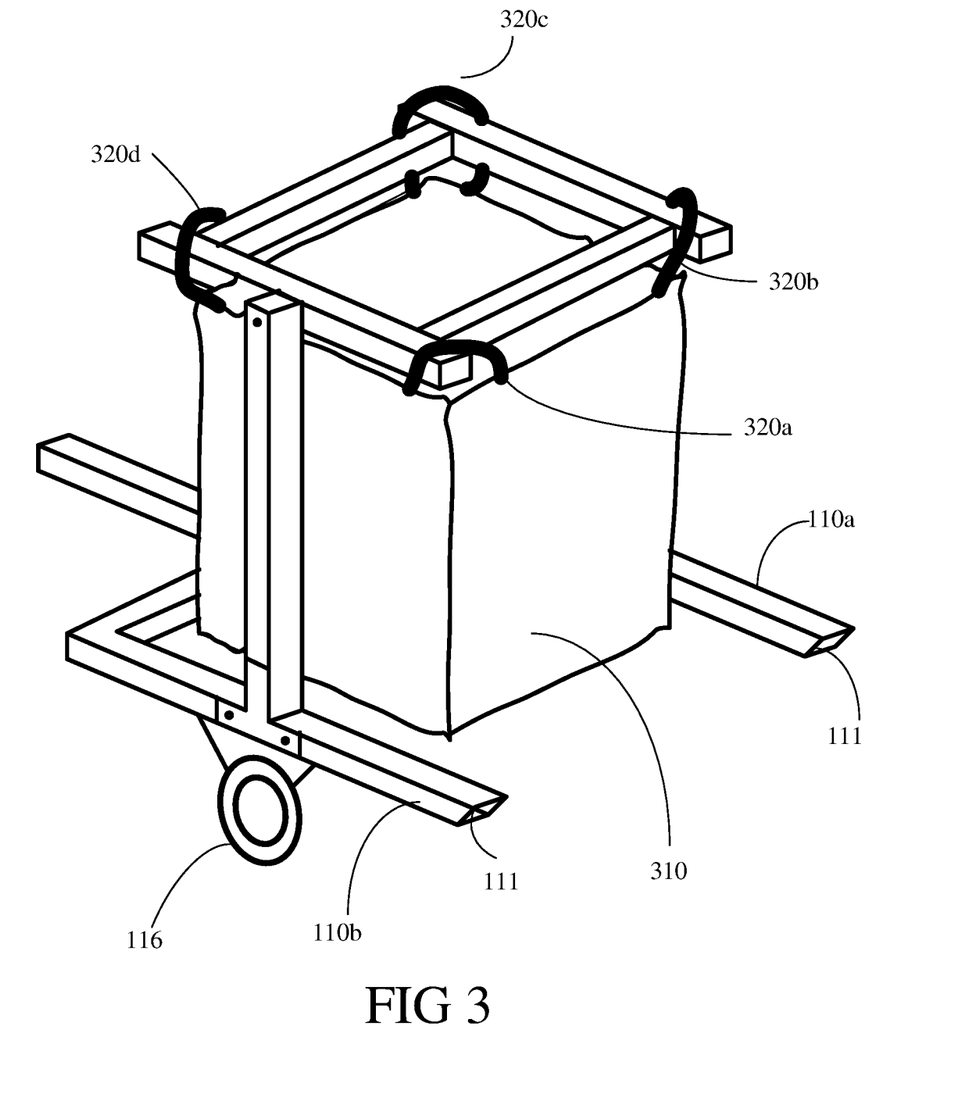
FIG. 3 presents the use of the cart for carrying builder's bag.

A builder's sack holding frame 130, called builders sack support, built from frame side rods 132 and frame front and rear rods 134 is pivotally attached to the load carrying rods 120a and 120b via pin hinges 124. The builder's sack holding frame is built so that the two frame sides rods 132 are longer than the distance between the frame front and frame rear rods 134.

The structure of the top frame 130 enables to easily attach builder's bag 310 to the garden cart, thus providing large volume for collecting scraps of garden pruning. Note that the builder's bag handles 320a, 320b, 320c and 320d are surrounding the edges of the frame side rods. The cart can be tilted so it is supported by the two wheels 116 and the supporting edges 111 at the end of the U-shaped chassis side rods 110a and 110b. In that position the builders sack is resting on the ground, with its top wide open, so it can be easily loaded, or it can be released from the cart.

Figure 4:
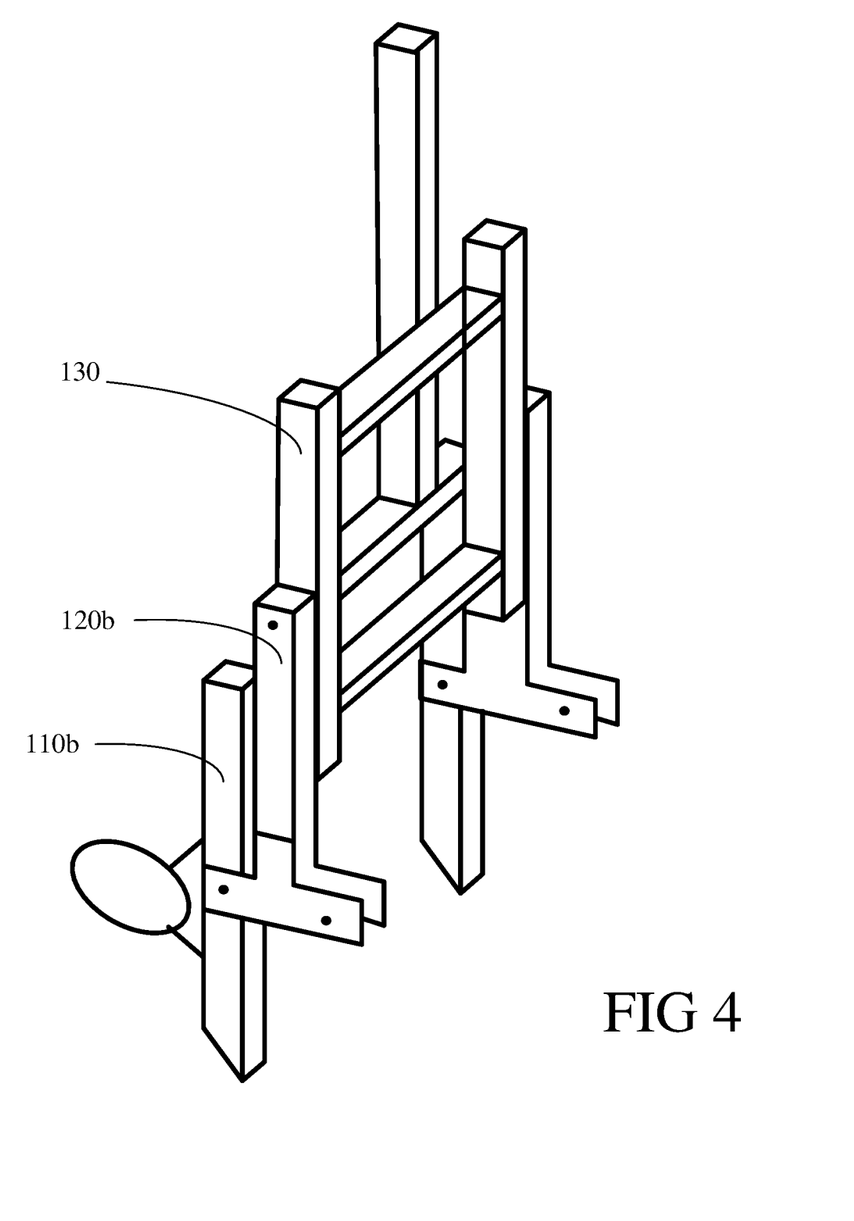
FIG. 4 presents cart in folded state for storage.

FIG. 4 shows the garden cart in folded state. In this state the cart occupies minimum volume so it can be easily stored. Note, that in another embodiment, the wheels can be attached via hinges so for storage they can be rotated and aligned with the plane of the U-shaped chassis.

Figure 5:
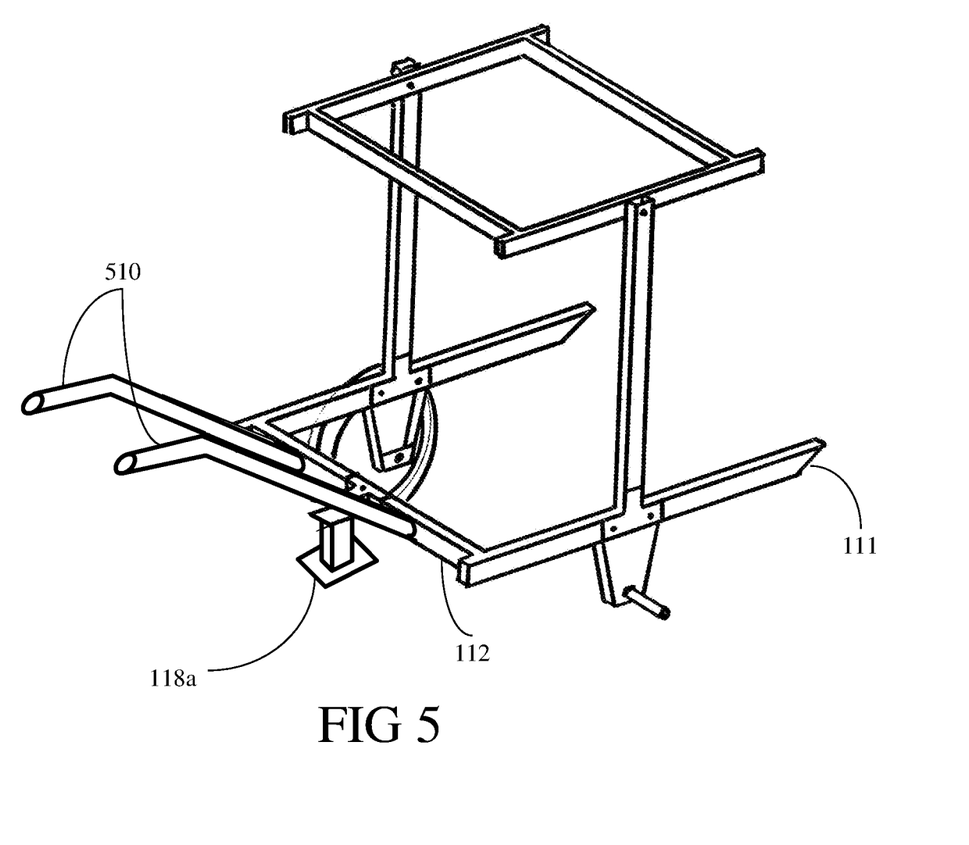
FIG. 5 another embodiment with human carrying handles.

In FIG. 5, garden cart with handles suitable for human towing is presented. The handles 510 are attached to the U-shaped chassis front rod 112. They can be attached at different locations so that the distance between the two handles can be optimized for the carrier. Note that when in rest the cart can be supported either by the wheels and the front support surface 118a or by the wheels and the rear of the U-shaped chassis side rods 111. It is optional to add a wheel instead of the support surface 118a for ease of handling.

Figure 6:
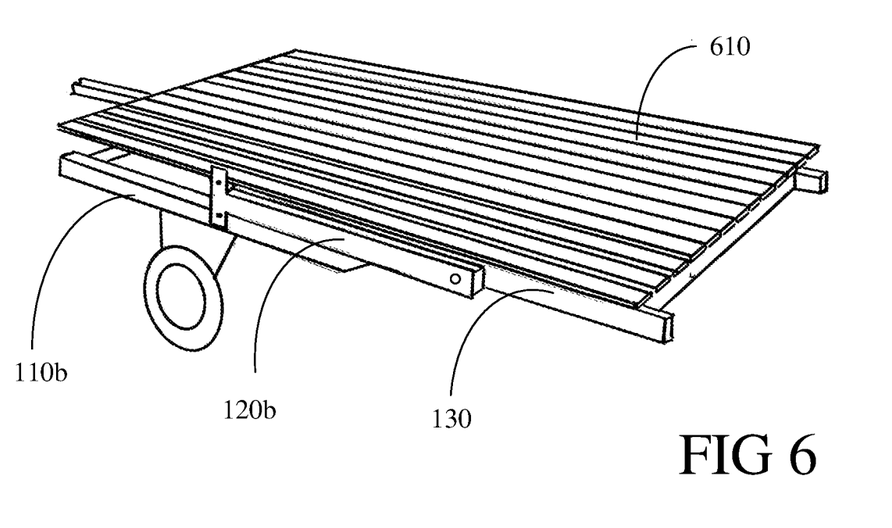
FIG. 6 cart ready for load carrying.

Additional use of the garden cart is presented in FIG. 6. In this configuration the cart is used as carrying platform. The builder's sack holding frame 130 and the load carrying rods are rotated so that they lie on the U-shaped chassis. A wooden deck 610 is place on top of the horizontal rods.

Figure 7:
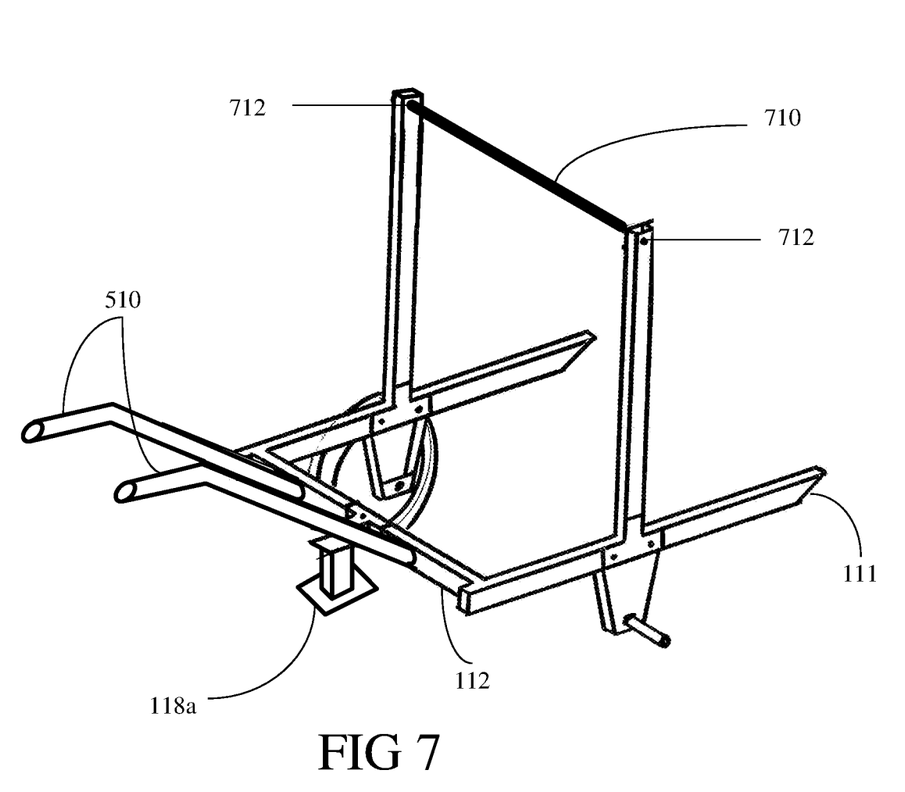
FIG. 7 presents another embodiment with load carrying rod.
Figure 8:
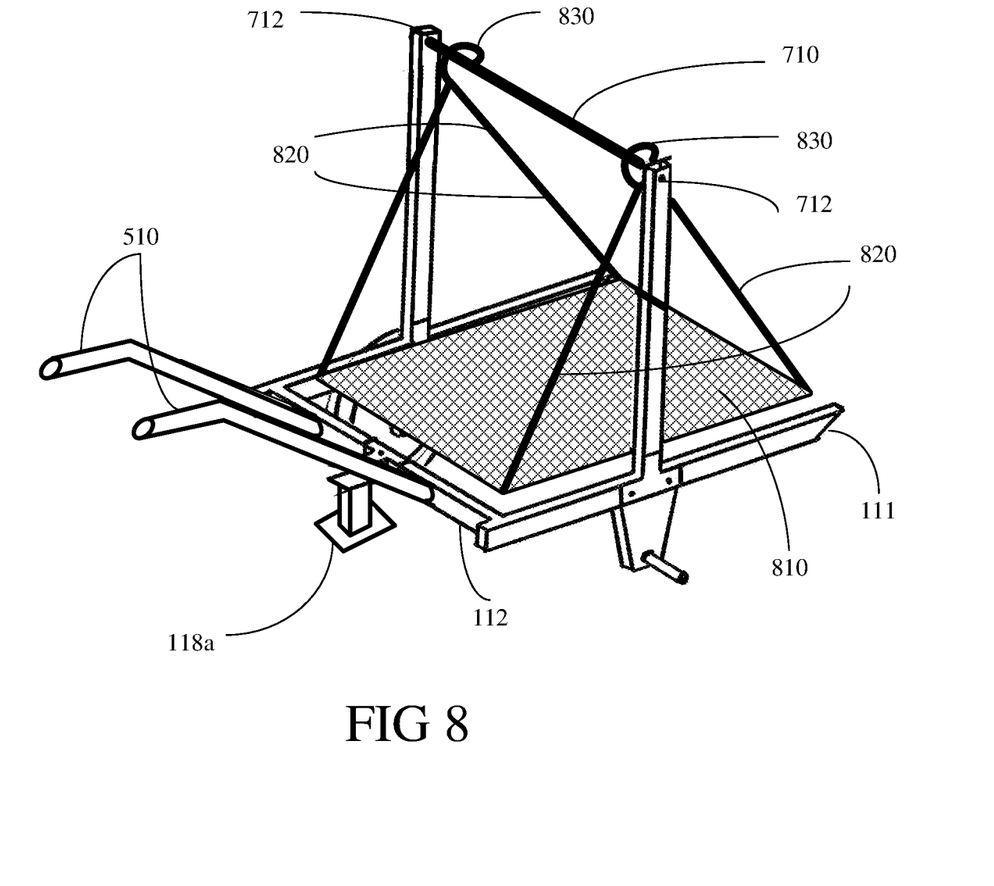
FIG. 8 shows use of the cart with load carrying rod

Another embodiment of the disclosed cart is shown in FIG. 7. In this embodiment a load hanging rod 710 is pivotally connected between the load carrying rods 110a and 110b via pivots 712. A load attached to the hanging rod 710 can rotate around it, so the load remains perpendicular to the ground regardless to the tilt angle of the garden cart. Note that the center of gravity of the hanged loads is close to the axis of the wheels so that small force is required to tilt the garden cart. An example of the use of the load hanging rod is shown in FIG. 8. A load carrying surface 810 is supported by 4 cables 820 connected at the bottom to the load carrying surface 810, and each pair of cables is attached at the top to a hook 830 firmly attached to the load hanging rod. Note that when the U-shaped chassis is lifted, the load carrying surface rests on the ground, so it is easy for loading/downloading.

What has been described above are just a few possible embodiments and use of the disclosed invention. It is of course, not possible to describe every conceivable combination of components and/or methodology, but one of ordinary skill in the art may recognize that many further combinations and permutations are possible. Accordingly, the invention is intended to embrace all such alterations, modifications, and variations that fall within the spirit and scope of the invention.

What is claimed is:

1. A foldable multifunction garden cart comprising:
   a) U-shaped chassis constructed of two chassis side rods connected by a chassis front rod;
   b) two wheels, wherein axles of the two wheels are rigidly attached under the center of said chassis side rods;
   c) a towing handle with a mounting support surface; the towing handle is being removably connected to the chassis front rod;
   d) two load carrying rods, each of the two load carrying rods pivotally attached to one of the two chassis side rods; said pivotally attached load carrying rods configured to be secured vertically to the plane of the U-shaped chassis or secured when resting on the two chassis side rods; and
   e) a sack holding frame constructed from two holding frame side rods rigidly connected by front and rear holding frame rods; the holding frame side rods are longer than the distance between the front and the rear holding frame rods, so that the handles of the sack can be hanged on it; said holding frame is removably, pivotally attached at the middle of the holding frame side rods, at the top of the load carrying rods,
   wherein the multifunction garden cart is configured to have a first open position and a second foldable closed storage position.

2. The multifunction garden cart as in claim 1, wherein a load hanging rod is pivotally connected between the top of the vertically secured load carrying rods, wherein hooks are firmly attached to the load hanging rod.

3. The multifunction garden cart as in claim 1, wherein two man carrying handles are removably connected to the front chassis rod.

4. The multifunction garden cart as in claim 1, wherein the towing handle is attached to a vehicle, by connecting a removable towing handle to the front chassis rod.

5. The multifunction garden cart as in claim 1, wherein the wheels are attached via hinges to the chassis side rods, so they can be rotated to a plane parallel to the U-shaped chassis for storage, or to a perpendicular plane to the U-shaped chassis for operation.

6. The multifunction garden cart of claim 5, wherein the wheels are locked by a pin in each position.

7. The multifunction garden cart of claim 1, further comprising a deck placed on top of the two chassis side rods.

8. The multifunction garden cart of claim 1, wherein the multifunction garden cart is locked in the first open position and the second foldable closed storage position.

9. The multifunction garden cart of claim 1, in combination with a load, wherein the center of gravity of the load is disposed generally above an axis connecting the axles of the two wheels.

10. The multifunction garden cart of claim 1, wherein the cart is configured to be connected to a towing vehicle.

* * * * *